April 15, 1941.     V. P. SHELTON     2,238,191
CAMERA
Original Filed Dec. 4, 1939

Inventor:
Vernon P. Shelton
by James R. McKnight
his Attorney.

Patented Apr. 15, 1941

2,238,191

UNITED STATES PATENT OFFICE 2,238,191

CAMERA

Vernon P. Shelton, Chicago, Ill.

Original application December 4, 1939, Serial No. 307,408. Divided and this application July 24, 1940, Serial No. 347,094

2 Claims. (Cl. 242—71)

This is a divisional application from the original filed on December 4, 1939, under Serial Number 307,408 for Camera now Patent No. 2,210,988 of Aug. 13, 1940.

It is well known that color film is expensive and for this reason is preferred in Bantam or 828 size. Kodachrome film is not made to fit such 120 cameras giving 2¼ inch square pictures, as the Rolleiflex, Rolleicord, Voightlander Superb, Korelle Reflex and the Super Ikonta B.

It is among the objects of this invention to provide means which when used in combination with said 120 cameras giving 2¼ inch square pictures that they may successfully use Bantam or 828 size color film. This application particularly relates to the adaptor elements. My invention contemplates such other objects, advantages and capabilities as will later more fully appear and which are inherently possessed by my invention.

While I have shown in the accompanying drawing a preferred form of my invention, yet I wish it understood that the same is susceptible of modification and change without departing from the spirit of my invention.

Figure 1:
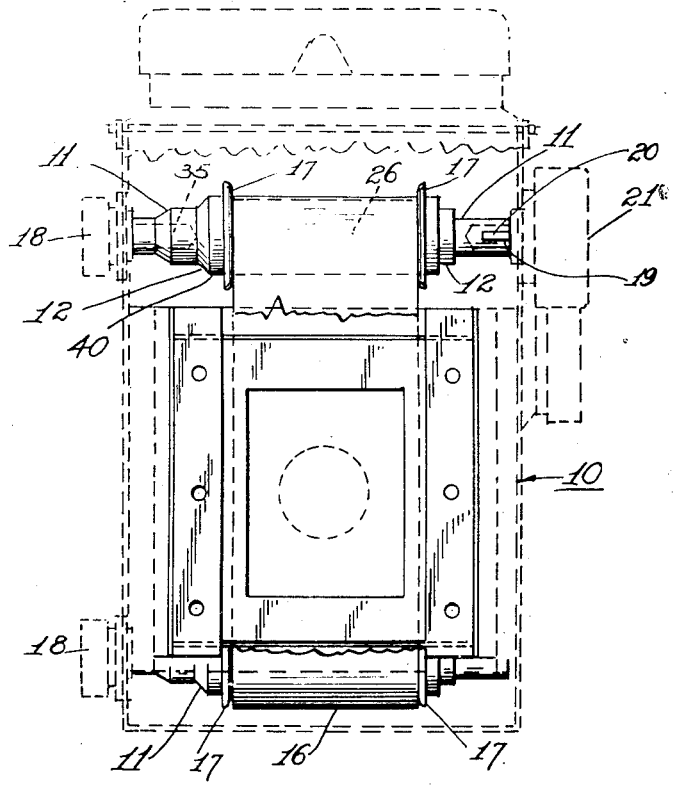
Figure 2:
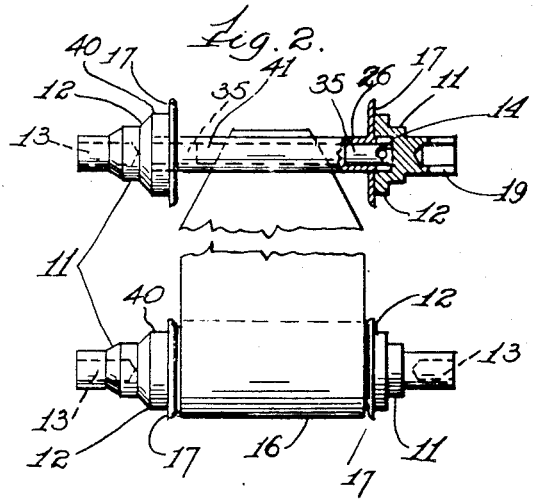
Figure 3:
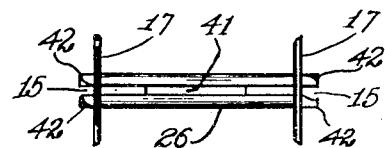
Figure 4:
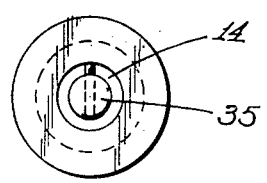

Referring to the drawing, Fig. 1 is an elevational view of a camera interior in combination with my adaptors and Bantam size spools; Fig. 2 is a detail view of the adaptors and film spool assembly; Fig. 3 is a detail view of a spool with its flanges and end portions and Fig. 4 is a detail view of an adaptor with its circular depression.

In the embodiment selected to illustrate my invention I remove the ordinary film supply spool from the engaging members of the 120 camera adapted to produce 2¼ inch square pictures, which camera I designate by the numeral 10, and provide a pair of removable spool adaptors 11. Each adaptor 11 has a body portion 12 with a recess 13 extending from one end inwardly to the interior of the body portion. Extending from the other end of the adaptor 11 is an extension 35. A shallow circular depression 14 is provided in an enlarged bell-shaped portion 40 of the body member 12 adjacent the inner ends of the extension 35. A Bantam size spool 16 is provided, having a hollow rounded core 41. A pair of spaced flanges 17 are attached to said core 41 adjacent its opposite ends. The ends extend beyond the flanges 17 and are cut away to form a plurality of spaced end portions 42. These end portions 42 are spaced, and surround receiving holes 15. The two adaptors 11 are positioned with their extensions 35 within opposite receiving holes 15 of the Bantam size spool 16, the spaced end portions 42 of said spool 16 being positioned within the circular depressions 14. The end portions 42 tend to contact against the inner walls surrounding the circular depression 14 to prevent accidental disengagement of the adaptors from the ends of the spool. The knobs 18 of the camera 10 are removably fitted within recesses 13 of adaptors 11. Bantam size spool 16 is of sufficient width to accommodate Bantam size film, which is commonly referred to as 828 film or in color as Eastman Bantam Kodachrome film.

The ordinary take-up spool is also removed from said 120 camera 10, and said adaptors 11 removably fitted to knobs 18, as heretofore described, to hold another Bantam size spool 26 similar in construction to spool 16. One of the adaptors 11 is provided with a lateral slot 19 to engage key 20 attached to knob 18 so that the turnable member 21 of the camera may be manually turned to move the film.

With my removable adapting members an ordinary 120 camera adapted to take 2¼ inch square pictures may be adapted to use color film of Bantam size. No structural changes in said 120 camera are necessary, said adapting members are all removable so that when their use is no longer desired the user may remove them without damage to his 120 camera and use the camera for its original purposes. The 120 camera may with my adapting members produce color film exposures economically and accurately and of a desired small size.

Having thus described my invention, I claim:

1. In combination with a camera having spool actuating knobs, and a spool having a core, a pair of spaced flanges attached to said core, the ends of said core extending beyond said core, each of said ends circularly surrounding an opening therein, a pair of spaced adaptors, each adaptor comprising a body portion having an inwardly extending recess in its outer end, and an inwardly extending extension continuing from the inner end of the body member, said body member having a shallow circular depression adjacent said extension, said recesses of said adaptors removably receiving the spool actuating knobs of the camera, said openings in opposite ends of said core removably receiving said extensions, and said shallow circular depressions of the body members removably receiving the ends of said core and preventing accidental disengagement of the spool from the adaptors.

2. In combination with a camera having a film supply spool and a film take-up spool each of said spools having a hollow rounded core, a pair of spaced flanges attached to said core, the ends of said core extending beyond said flanges, said ends cut away to form a plurality of spaced end portions, said end portions on each end of said core spaced and surrounding an opening, and actuating knobs for said spools, a pair of spaced adaptors for each of said spools, each adaptor having a body portion with a recess extending inwardly from its outer end to the interior thereof, an extension extending inwardly from its inner end and an enlarged bell-shaped portion with a substantially circular depression formed therein adjacent the inner end of said extension, said recesses of each pair of said adaptors removably receiving opposite spool actuating knobs of the camera, said openings at the opposite ends of each pair of said spools removably receiving the spaced extensions of said adaptors, and said substantially circular depressions in each pair of said adaptors removably receiving the spaced end portions on opposite ends of said core, said end portions being adapted to contact the inner walls of the bell-shaped portion surrounding the substantially circular depression to prevent accidental disengagement of the spools from the adaptors.

VERNON P. SHELTON.